United States Patent
Duclos

(10) Patent No.: US 11,505,695 B2
(45) Date of Patent: Nov. 22, 2022

(54) EPOXY COMPOSITION CONTAINING COPOLYAMIDE AND BLOCK COPOLYMER WITH POLYAMIDE AND POLYETHER BLOCKS

(71) Applicant: Zephyros, Inc., Romeo, MI (US)

(72) Inventor: Vincent Duclos, Strasbourg (FR)

(73) Assignee: Zephyros, Inc., Romeo, MI (US)

( * ) Notice: Subject to any disclaimer, the term of this patent is extended or adjusted under 35 U.S.C. 154(b) by 402 days.

(21) Appl. No.: 16/708,089

(22) Filed: Dec. 9, 2019

(65) Prior Publication Data
US 2020/0109280 A1 Apr. 9, 2020

Related U.S. Application Data

(63) Continuation of application No. 15/534,028, filed as application No. PCT/US2015/063352 on Dec. 2, 2015, now Pat. No. 10,501,619.
(Continued)

(51) Int. Cl.
*C08L 63/00* (2006.01)
*C08L 77/00* (2006.01)
(Continued)

(52) U.S. Cl.
CPC ............... *C08L 63/00* (2013.01); *C08G 69/40* (2013.01); *C08K 3/22* (2013.01); *C08L 71/00* (2013.01);
(Continued)

(58) Field of Classification Search
CPC .......... C08L 63/00; C08L 71/00; C08L 71/12; C08L 77/00; C08L 77/02; C08L 77/10; C08L 87/005; C08L 2203/14; C08L 2205/025; C08L 2205/035; C08G 69/40; C08K 3/22; C09J 5/06; C09J 5/08; C09J 163/00; C09J 2400/24; C09J 2463/00; C09J 2471/00; C09J 2477/00
See application file for complete search history.

(56) References Cited

U.S. PATENT DOCUMENTS 2,071,250 A 2/1937 Carothers
2,071,251 A 2/1937 Carothers
(Continued)

FOREIGN PATENT DOCUMENTS

DE 3730504 C1 3/1989
EP 0613919 A1 9/1994
(Continued)

OTHER PUBLICATIONS

Lee, Neville: Handbook of Epoxy Resins, 1967, Mcgraw-Hill Book Co.
(Continued)

*Primary Examiner* — Daniel H Lee
(74) *Attorney, Agent, or Firm* — The Dobrusin Law Firm, PC

(57) ABSTRACT

A composition that toughens and impact modifies epoxy resin based compositions comprising one or more co-polyamides and one or more block copolymers with polyamide and polyether blocks. The disclosure also relates to epoxy resin compositions containing the composition comprising one or more co-polyamides and one or more block copolymers with polyamide and polyether blocks and films, adhesives, foamable compositions and foamed compositions containing such a composition.

16 Claims, 2 Drawing Sheets

Related U.S. Application Data

(60) Provisional application No. 62/091,736, filed on Dec. 15, 2014.

(51) Int. Cl.

| | | |
|---|---|---|
| *C08L 71/00* | (2006.01) | |
| *C08L 77/02* | (2006.01) | |
| *C08G 69/40* | (2006.01) | |
| *C08K 3/22* | (2006.01) | |
| *C08L 77/10* | (2006.01) | |
| *C08L 71/12* | (2006.01) | |
| *C08L 87/00* | (2006.01) | |
| *C09J 5/06* | (2006.01) | |
| *C09J 5/08* | (2006.01) | |
| *C09J 163/00* | (2006.01) | |

(52) U.S. Cl.
CPC .............. *C08L 71/12* (2013.01); *C08L 77/00* (2013.01); *C08L 77/02* (2013.01); *C08L 77/10* (2013.01); *C08L 87/005* (2013.01); *C09J 5/06* (2013.01); *C09J 5/08* (2013.01); *C09J 163/00* (2013.01); *C08L 2203/14* (2013.01); *C08L 2205/025* (2013.01); *C08L 2205/035* (2013.01); *C09J 2400/24* (2013.01); *C09J 2463/00* (2013.01); *C09J 2471/00* (2013.01); *C09J 2477/00* (2013.01)

(56) References Cited

U.S. PATENT DOCUMENTS

| | | |
|---|---|---|
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,307,782 A | 7/1967 | Henss et al. |
| 3,393,210 A | 7/1968 | Speck |
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,115,475 A | 9/1978 | Foy et al. |
| 4,195,015 A | 3/1980 | Deleens et al. |
| 4,230,838 A | 10/1980 | Foy et al. |
| 4,304,709 A | 12/1981 | Salee |
| 4,306,040 A | 12/1981 | Baer |
| 4,331,786 A | 5/1982 | Foy et al. |
| 4,332,920 A | 6/1982 | Foy et al. |
| 4,483,975 A | 11/1984 | de Jong et al. |
| 4,495,324 A | 1/1985 | Chacko et al. |
| 4,536,436 A | 8/1985 | Maeoka et al. |
| 4,839,441 A | 6/1989 | Cuzin et al. |
| 4,864,014 A | 9/1989 | Cuzin et al. |
| 5,030,698 A | 7/1991 | Mulhaupt et al. |
| 5,140,069 A | 8/1992 | Mulhaupt et al. |
| 5,459,230 A | 10/1995 | de Jong et al. |
| 6,668,457 B1 | 12/2003 | Czaplicki |
| 6,776,869 B1 | 8/2004 | Schenkel |
| 6,811,864 B2 | 11/2004 | Czaplicki et al. |
| 6,846,559 B2 | 1/2005 | Czaplicki et al. |
| 6,884,854 B2 | 4/2005 | Schoenfeld et al. |
| 6,887,914 B2 | 5/2005 | Czaplicki et al. |
| 6,890,969 B2 | 5/2005 | Rabasco et al. |
| 6,913,804 B2 | 7/2005 | Arkema |
| 6,956,099 B2 | 10/2005 | Pavlin |
| 7,125,461 B2 | 10/2006 | Czaplicki et al. |
| 7,199,165 B2 | 4/2007 | Kassa et al. |
| 7,438,782 B2 | 10/2008 | Sheasley et al. |
| 7,473,715 B2 | 1/2009 | Czaplicki et al. |
| 7,892,396 B2 | 2/2011 | Sheasley |
| 8,114,387 B2 | 2/2012 | Pavlin |
| 8,114,424 B2 | 2/2012 | Pavlin |
| 8,119,149 B2 | 2/2012 | Pavlin |
| 8,119,741 B2 | 2/2012 | Pavlin |
| 2004/0076831 A1 | 4/2004 | Hable et al. |
| 2004/0204551 A1 | 10/2004 | Czaplicki et al. |
| 2007/0270515 A1 | 11/2007 | Chmielewski et al. |
| 2008/0182945 A1 | 7/2008 | Malet |
| 2013/0085239 A1 | 4/2013 | Zander et al. |
| 2013/0149531 A1 | 6/2013 | Kosal et al. |
| 2013/0296502 A1 | 11/2013 | Malet |
| 2014/0113983 A1 | 4/2014 | Czaplicki |
| 2016/0160087 A1 | 6/2016 | Awkal et al. |
| 2016/0160092 A1 | 6/2016 | Awkal et al. |

FOREIGN PATENT DOCUMENTS

| | | |
|---|---|---|
| WO | 9844045 A1 | 10/1998 |
| WO | 03/063572 A2 | 8/2003 |
| WO | 2004/083280 A1 | 9/2004 |
| WO | 2006/076341 A2 | 7/2006 |

OTHER PUBLICATIONS

International Search Report for application No. PCT/US2015/063352 dated Mar. 22, 2016.

European First Communication dated Sep. 5, 2019. Application No. 15813980.8.

EPOXY COMPOSITION CONTAINING COPOLYAMIDE AND BLOCK COPOLYMER WITH POLYAMIDE AND POLYETHER BLOCKS

FIELD

The present disclosure relates to a composition that toughens and impact modifies epoxy resin based compositions comprising one or more co-polyamides and one or more block copolymers with polyamide and polyether blocks. The present disclosure also relates to epoxy resin compositions containing the composition comprising one or more co-polyamides and one or more block copolymers with polyamide and polyether blocks and films, adhesives, foamable compositions and foamed compositions containing such a composition.

BACKGROUND

For many years industry, and particularly the transportation industry has been concerned with providing functional attributes of sealing, baffling, acoustic attenuation, sound dampening and reinforcement to articles of manufacture such as automotive vehicles. Industry has developed a wide variety of materials and parts for providing such functional attributes. Epoxy resin based compositions have been used in the materials and parts to address these issues, see for example Czaplicki et. al. U.S. Pat. No. 6,890,969; Czaplicki et. al. U.S. Pat. No. 7,473,715; Czaplicki et. al. U.S. Pat. No. 6,846,559; Czaplicki U.S. Pat. No. 6,668,457; Kassa et. al. U.S. Pat. No. 7,199,165; and Sheasly et. al. U.S. Pat. No. 7,438,782, all incorporated herein by reference in their entirety. Epoxy resin based compositions are used for many of these applications because they exhibit high glass transition temperatures and can be used in environments where the materials are exposed to high temperatures because such compositions retain their integrity in such environments. Epoxy resin compositions can be brittle, have low ductility, and can fracture if subjected to elongation. Epoxy resin compositions are modified to include toughening agents to improve ductility and/or elastomers to improve epoxy resin compositions response to elongation. The problem with modifying epoxy resin compositions with toughening agents and elastomers is that such materials reduce the glass transition temperature of the compositions. Examples of additives used in epoxy resin compositions are disclosed in Muelhaupt U.S. Pat. No. 5,030,698; Muelhaupt U.S. Pat. No. 5,140,069; Schenkel U.S. Pat. No. 6,776,869; Schoenfeld et. al. U.S. Pat. No. 6,884,854 and Longo WO 2006/076341, all incorporated herein by reference in their entirety.

Thus, what is needed is systems that can modify epoxy resin based compositions to improve ductility and the elongation properties of the compositions without reducing the glass transition temperature of the compositions. What are also needed are systems wherein the functional properties of the epoxy resin compositions are retained; for example foam, adhesive, film, and coating properties and the like.

SUMMARY

This disclosure relates to a composition comprising one or more block co-polymers having one or more polyamide blocks and one or more polyether blocks; and one or more co-polyamides. The molar ratio of the one or more block co-polymers having one or more polyamide blocks and one or more polyether blocks; and one or more co-polyamides may be of about 2:1 to about 1:6. The composition may comprise from about 17 to about 70 parts by weight of one or more block co-polymers having one or more polyamide blocks and one or more polyether blocks; and from about 30 to about 83 parts by weight of one or more co-polyamides: wherein the total parts by weight of the components is 100. This composition may be added to epoxy resin based compositions. The components may be added to epoxy resin compositions as a mixture or individually.

This disclosure also relates to epoxy compositions containing i) a mixture of one or more block co-polymers having one or more polyamide blocks and one or more polyether blocks and one or more co-polyamides or ii) one or more co-polymers comprising one or more copolyamide sections and one or more polyether blocks. The hybrid polymer may contain the same ratios of blocks as in the blend. Such epoxy compositions may include the mixture of one or more block co-polymers having one or more polyamide blocks and one or more polyether blocks and one or more co-polyamides in the molar ratios and parts by weight as disclosed herein. The epoxy compositions may comprise the one or more hybrid polymers comprising one or more copolyamide sections and one or more polyether blocks wherein the blocks are present in the disclosed ratios. The compositions may comprise a); one or more epoxy resins having on average more than one epoxy functional group per molecule; b); one or more curing agents for epoxy resins; and c) i) a mixture of one or more block co-polymers having one or more polyamide blocks and one or more polyether blocks and one or more co-polyamides or ii) or one or more co-polymers comprising one or more copolyamide sections and one or more polyether blocks. The epoxy compositions may further comprise d) one or more elastomers. Such compositions may contain one or more of the following materials: one or more nucleators; one or more blowing agents; one or more impact modifiers; one or more adhesion promoters; one or more thixotropes; and cure accelerators for epoxy resins. Such compositions may further comprise other known components and/or additives commonly utilized in epoxy resin based compositions.

Also disclosed are a number of methods that utilize compositions disclosed herein. One method comprises applying a composition disclosed herein to a first substrate, contacting a second substrate with the first substrate with the applied composition disposed between the substrates, and exposing the contacted substrates to temperatures at which the applied composition cures and the substrates are bonded together.

Additive compositions disclosed herein provide improved ductility and elongation properties to epoxy resin containing compositions while maintaining relatively high glass transition temperatures for the cured products prepared from the compositions. The cured epoxy resin compositions disclosed herein preferably exhibit a tensile modulus of about 1000 MPa and more preferably about 1500 MPa, as determined according to ISO527 standard. The cured epoxy resin compositions disclosed herein preferably exhibit an elongation of about 10 percent or greater, more preferably about 15 percent or greater and most preferably about 20 percent or greater, as determined according to ISO527 standard. The cured epoxy resin compositions disclosed herein preferably exhibit a glass transition temperature of about 95° C. or greater, more preferably about 100° C. or greater and most preferably about 105° C. or greater. The Tg is based on the tan delta peak obtained from dynamic mechanical analysis (DMA) as described in US 2014/113983 (also published as WO 2012/110230) incorporated herein by reference. The epoxy resin compositions disclosed herein may be utilized in any application that requires one or more of the recited properties, examples include adhesive films, structural adhesives, foams, curable foams on substrates, coatings, and the like. The compositions disclosed or structures containing such compositions may be used to bond substrates together, to bond parts of assemblies such as vehicles together, as structural reinforcement parts for manufactured articles (such as vehicles); and the like. Disclosed are compositions that may be utilized as is, in blends, in articles and in a variety of methods. Articles that commonly have cured or uncured epoxy resin based compositions may contain the compositions disclosed herein. The compositions may be utilized in foamable compositions, foams, coatings, and the like. The articles comprising substrates may have a composition disclosed herein disposed thereon in the form of a film, foamable composition, foam and the like. Examples of articles containing compositions disclosed herein include: films, tapes, and substrates having an epoxy resin based composition disclosed herein disposed on one or more surfaces of the invention, for example nylon baffles. The composition may be in a cured or uncured state. Exemplary structures include a film of the composition disposed between two substrates, a tape of baffle adapted to fill gaps, reinforcing patches, and the like.

DETAILED DESCRIPTION

Figure 1:
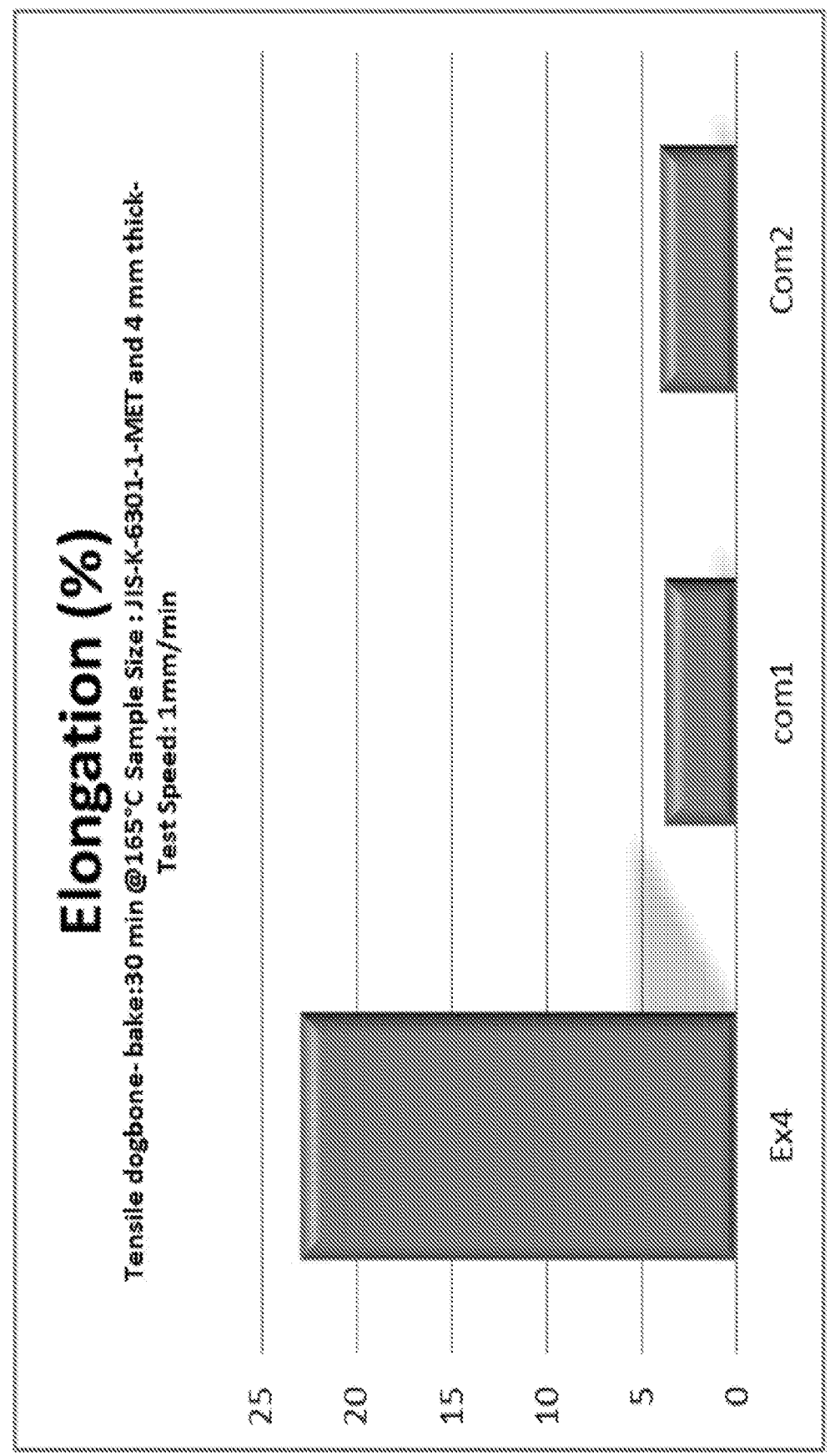
FIG. 1 is a histogram of elongation data.

The explanations and illustrations presented herein are intended to acquaint others skilled in the art with the invention, its principles, and its practical application. Accordingly, the specific embodiments of the present disclosure as set forth are not intended as being exhaustive or limiting. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The disclosure relates to a composition comprising a mixture of one or more block co-polymers having one or more polyamide blocks and one or more polyether blocks, and one or more co-polyamides. The molar ratio of the one or more block co-polymers having one or more polyamide blocks and one or more polyether blocks to the one or more co-polyamides may be of about 2:1 to about 1:6. The composition may comprise from about 17 to about 70 parts by weight of one or more block co-polymers having one or more polyamide blocks and one or more polyether blocks; and from about 30 to about 83 parts by weight of one or more co-polyamides: wherein the total parts by weight of the components is 100. This composition may be added to epoxy resin based compositions. The components may be added to epoxy resin compositions as a mixture or individually. Alternatively, a co-polymer having one or more copolyamide sections and one or more polyether sections may be added to epoxy compositions. The ratio of the one or more copolyamide sections to the one or more polyether sections in the co-polymers may be the same as disclosed for the mixtures disclosed herein.

Copolyamides useful are random copolymers of two or more different polyamide units which improve the toughness and ductility of cured epoxy resin compositions. Any copolyamide that provides these advantages may be utilized in the concentrates. Polyamides can be prepared by the reaction of one or more diamines and one or more dicarboxylic acids; by the condensation of one or more α,ω-aminocarboxylic acids and/or of one or more lactams having from 6 to 12 carbon atoms in the presence of a dicarboxylic acid having from 4 to 12 carbon atoms or of a diamine and are of low mass, that is to say of (Mn) 400 to 800; or by the condensation of at least one α,ω-aminocarboxylic acid (or one lactam), at least one diamine and at least one dicarboxylic acid. The polyamides used are well known in the art and embrace semi-crystalline and amorphous resins having an average molecular weight of at least 5,000 Mn and commonly referred to as nylons. Exemplary polyamides include those described in U.S. Pat. Nos. 2,071,250; 2,071,251; 2,130,523; 2,130,948; 2,241,322; 2,312,966; 2,512,606; 3,393,210; 2,071,250; 2,071,251; 2,130,523; 2,130,948; 2,241,322; 2,312,966; and 2,512,606; all incorporated herein by reference in their entirety. The copolyamides may be produced by condensation of equimolar amounts of saturated dicarboxylic acids containing from 4 to 12 carbon atoms with a diamine, in which the diamine contains from 4 to 14 carbon atoms. Excess diamine can be employed to provide an excess of amine end groups over carboxyl end groups in the copolyamide. Examples of polyamides units comprise hexamethylene adipamide (66 nylon), hexamethylene azelaamide (69 nylon), hexamethylene sebacamide (610 nylon), and hexamethylene dodecanoamide (612 nylon). Copolyamides may be prepared by the copolymerization of two or terpolymerization of the above building blocks or their components, e.g., an adipic, isophthalic acid, hexamethylene diamine and the like. Alternatively, the copolyamides may be prepared by copolymerizing polyamides such as Nylon 6, Nylon 66 and Nylon 12. According to an alternative form of this synthesis, the co-polyamides are formed by the condensation of at least two α,ω-aminocarboxylic acids or of at least two lactams having from 6 to 12 carbon atoms or of a lactam and of an aminocarboxylic acid not having the same number of carbon atoms, in the optional presence of a chain-limiting agent. Preferably the various constituents of the polyamides and their proportions are chosen in order to obtain a melting temperature of less than 150° C., more preferably about 140° C. or less and more preferably of from about 90 to 135° C. Copolyamides with low melting temperatures are disclosed in patents U.S. Pat. No. 4,483,975, DE 3 730 504, U.S. Pat. Nos. 5,459,230 and 6,913,804, all incorporated herein by reference in their entirety. These copolyamides may be used alone or in combination. Copolyamides useful in the compositions are commercially available, for example Platamid 2674 copolyamides available from Arkema. The amount of copolyamide in the additive composition of the invention and in the epoxy resin compositions is sufficient to provide the desired properties of the cured epoxy resin compositions.

Additive composition as used herein refers to a blend of one or more copolyamides and one or more block co-polymers having one or more polyamide blocks and one or more polyether blocks. Alternatively the additive composition may comprise one or more co-polymers having copolyamide sections and one or more polyether sections. Preferably the amount of copolyamide utilized in the additive composition is about 17 parts by weight or greater based on the weight of the additive composition and most preferably about 47 percent by weight or greater. Preferably the amount of copolyamide in the additive composition is about 80 parts by weight or less based on the weight of the additive composition and more preferably about 75 percent by weight or less. Preferably the amount of copolyamide in epoxy resin compositions about 5 parts by weight or greater based on the weight of the epoxy compositions and most preferably about 8 parts by weight or greater. Preferably the amount of copolyamide in the epoxy resin compositions is about 20 parts by weight or less based on the weight of the epoxy resin compositions and most preferably about 15 parts by weight or less. In the embodiment wherein a co-polymer having copolyamide sections and one or more polyether sections is used the co-polymer may be used in a sufficient amount to achieve the desired properties recited herein. Preferably the co-polymer having copolyamide sections and one or more polyether sections is present in an amount of about 5 parts by weight or greater and more preferably 7 parts by weight of epoxy compositions. Preferably the co-polymer having copolyamide sections and one or more polyether sections is present in an amount of about 30 parts by weight or less and more preferably 27 parts by weight of less.

The additive compositions and epoxy resin compositions comprise a mixture of one or more block co-polymers having one or more polyamide blocks and one or more polyether blocks and one or more copolyamides or one or more co-polymers having one or more copolyamide sections and one or more polyether sections. Any block co-polymers having one or more polyamide blocks and one or more polyether blocks or co-polymers having copolyamide sections and one or more polyether sections which improve the toughness and ductility of cured epoxy resin compositions may be utilized in the disclosed compositions. The one or more block co-polymers having one or more polyamide blocks and one or more polyether blocks comprise one or more blocks of polyamides prepared as disclosed hereinbefore and one or more polyether blocks. The polyamide blocks can be copolyamides as disclosed herein or polyamides containing only one amide repeating unit. The processes to prepare copolyamides and polyamides are similar except for the choice of starting materials. The polyether blocks are preferably polyalkylene oxide blocks. The block copolymers may comprise one or more of each block. The copolymers comprising polyamide blocks and polyether blocks result from the copolycondensation of polyamide polymers comprising reactive ends with polyether polymers comprising reactive ends, such as, inter alia: 1) polyamide polymers comprising diamine chain ends with polyoxyalkylene polymers comprising dicarboxyl chain ends, 2) polyamide polymers comprising dicarboxyl chain ends with polyoxyalkylene polymers comprising diamine chain ends obtained by cyanoethylation and hydrogenation of aliphatic α,ω-dihydroxylated polyoxyalkylene polymers, known as polyetherdiols, 3) polyamide polymers comprising dicarboxyl chain ends with polyetherdiols, the products obtained being, in this specific case, polyetheresteramides. The polymers comprising polyamide blocks and polyether blocks can also comprise randomly distributed units. These polymers can be prepared by the simultaneous reaction of the polyether and of the precursors of the polyamide blocks. For example, polyetherdiol, polyamide precursors and a chain-limiting diacid can be reacted. A polymer is obtained which has essentially polyether blocks, polyamide blocks of highly variable length but also the various reactants which have reacted randomly, which are distributed randomly (statistically) along the polymer chain. Polyetherdiamine, polyamide precursors and a chain-limiting diacid can also be reacted. A polymer is obtained which has essentially polyether blocks, polyamide blocks of highly variable length but also the various reactants which have reacted randomly, which are distributed randomly (statistically) along the polymer chain The polyether blocks can represent 5 to 85 percent by weight of the copolymer comprising polyamide and polyether blocks. The polyether blocks may be composed of alkylene oxide units. These units can, for example, be ethylene oxide units, propylene oxide units or tetrahydrofuran units (which results in polytetramethylene glycol links). PEG blocks, that is to say those composed of ethylene oxide units, PPG blocks, that is to say those composed of propylene oxide units, and PTMG blocks, that is to say those composed of tetramethylene glycol units, also known as polytetrahydrofuran blocks, are thus used. PEG blocks or blocks obtained by oxyethylation of bisphenols, such as, for example, bisphenol A, are advantageously used. The latter products have been disclosed in Patent EP 613 919 incorporated herein by reference in its entirety. The polyether blocks can also be composed of ethoxylated primary amines. These blocks also are advantageously used. Mention may be made, as examples of ethoxylated primary amines, of the products of formula:

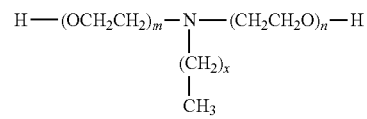

in which m and n are between 1 and 20 and x between 8 and 18. These products are commercially available under the Noramox® trademark from Ceca and under the Genamin® trademark from Clariant. The amount of polyether blocks in these copolymers comprising polyamide blocks and polyether blocks is advantageously from 10 to 70 percent by weight of the copolymer, preferably from 35 to 60 percent by weight.

The polyether diol blocks are either used as such and copolycondensed with polyamide blocks comprising carboxyl ends or they are aminated, to be converted to polyetherdiamines, and condensed with polyamide blocks comprising carboxyl ends. They can also be blended with polyamide precursors and a chain-limiting diacid to prepare polymers comprising polyamide blocks and polyether blocks having randomly distributed units. The number-average molar mass (Mn) of the polyamide sequences is from 500 to 10,000 and preferably from 500 to 4000. The mass Mn of the polyether sequences is from 100 to 6000 and preferably from 200 to 3000.

The block copolymers can be prepared by any means which makes it possible to link together the polyamide blocks and the polyether blocks. In practice, use is made of essentially 2 processes, one known as a two-stage process and the other as a one-stage process. In the two-stage process, the polyamide blocks are first manufactured and then, in the second stage, the polyamide blocks and the polyether blocks are linked together. In the one-stage process, the polyamide precursors, the chain-limiting agent and the polyether are blended. A polymer is then obtained which essentially has polyether blocks, polyamide blocks of highly variable length but also the various reactants which have reacted randomly, which are distributed randomly (statistically) along the polymer chain. Whether this is a one- or two-stage process, it is advantageous to carry it out in the presence of a catalyst. Use may be made of a catalyst disclosed in U.S. Pat. Nos. 4,331,786, 4,115,475, 4,195,015, 4,839,441, 4,864,014, 4,230,838 and 4,332,920.

Polymers having one or more polyamide blocks and one or more polyether blocks useful in the compositions are commercially available, for example PEBAX 2533 block polyether amide copolymers available from Arkema. Hybrid polymers are commercially available from Arkema, for example, PLATAMID™ 2694 copolyamides. The amount of in the additive composition of the invention and in the epoxy resin compositions is sufficient to provide the desired properties of the cured epoxy resin compositions. Preferably the amount of block co-polymers in the additive composition utilized in the additive composition is about 23 parts by weight or greater based on the weight of the additive composition and most preferably about 30 percent by weight or greater. Preferably the amount of block co-polymers in the additive composition is about 83 parts by weight or less based on the weight of the additive composition and more preferably about 53 parts by weight or less. Preferably the amount of block co-polymers in epoxy resin compositions about 3 parts by weight or greater based on the weight of the epoxy compositions and most preferably about 4 parts by weight or greater. Preferably the amount of block co-polymers in the epoxy resin compositions is about 15 parts by weight or less based on the weight of the epoxy resin compositions and most preferably about 10 parts by weight or less.

Epoxy based compositions as used herein mean compositions containing epoxy functional groups as a significant portion of the reactive groups. Such compositions contain epoxy groups (glycidyl groups ((2,3-epoxypropyl)ether) or oxiranes) which are polymerizable by a ring opening reaction (hereinafter referred to as epoxy groups). The epoxy resins useful include any of the conventional dimeric, oligomeric or polymeric epoxy materials containing at least one epoxy functional group. Such compositions may contain one or more compounds with more than one on average epoxy groups, preferably 1.5 or more epoxy groups, and more preferably 2 or more epoxy groups. The epoxides (epoxy resins) can be monomeric or polymeric, and aliphatic, cycloaliphatic, heterocyclic, aromatic, or mixtures thereof. The more preferred epoxides are aromatic and contain more than 1.5 epoxy groups per molecule and most preferably more than 2 epoxy groups per molecule. Preferable epoxy resins have a molecular weight of about 150 to 10,000 and preferably from about 300 to 1,000. Preferable epoxy resins include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof. Preferred are aromatic epoxides (glycidyl ether)s and derivatives thereof (oligomers and polymers) such as those prepared by reacting a polyhydric phenol with an excess of epichlorohydrin. Examples of useful phenols include resorcinol, catechol, hydroquinone, and the polynuclear phenols including p,p'-dihydroxydibenzyl, p,p'-dihydroxydiphenyl, p,p'-dihydroxydiphenyl sulfone, p,p'-dihydroxybenzophenone, 2,2'-dihydroxy-1,1-dinaphthylmethane and the 2,2', 2,3', 2,4', 3,3', 3,4' and 4,4' isomers of dihydroxydiphenylmethane, dihydroxydiphenyldimethylmethane, dihydroxydiphenyl-ethylmethylmethane, dihydroxydiphenylmethyl-propylmethane, dihydroxydiphenyl-ethylphenylmethane, dihydroxydiphenylpropylphenylmethane, dihydroxydiphenyl butyl-phenylmethane, dihydroxydiphenyltolylmethane, dihydroxydiphenyl tolyl methyl methane, dihydroxydiphenyldicyclohexylmethane, and dihydroxydiphenylcyclohexane. Also preferred are polyhydric phenolic formaldehyde condensation products as well as polyglycidyl ethers that contain as reactive groups only epoxy groups or hydroxy groups. Useful materials include diglycidyl ethers of bisphenol A and of novolac resins, such as described in "Handbook of Epoxy Resins" by Lee and Neville, McGraw-Hill Book Co., New York (1967), incorporated herein by reference. Epoxides with flexibilized backbones are also useful. Preferred materials include diglycidyl ethers of bisphenol A and diglycidyl ethers of bisphenol F, and most preferably diglycidyl ethers of bisphenol A, because of the desirable adhesive properties that these materials attain upon curing. Examples of commercially available epoxides useful in the invention include diglycidyl ethers of bisphenol A (e.g., those available under the trademarks EPON 828, EPON 1001, and EPONEX 1510 from Shell Chemical Company, and DER-331, DER-332, and DER-334 available from The Dow Chemical Company); diglycidyl ethers of bisphenol F (e.g., EPICLON™ 830 available from Dai Nippon Ink and Chemicals Inc.); silicone resins containing diglycidyl epoxy functionality; flame retardant epoxy resins (e.g., DER™ 580, a brominated bisphenol type epoxy resin available from The Dow Chemical Company; and 1,4-butanediol diglycidyl ethers. The epoxy resin may be supplied as one or more solid resins (e.g., epoxy resin that is solid at 23° C. and can be supplied as pellets, chunks, pieces or the like), one or more liquid (e.g., epoxy resin that is liquid at 23° C.) or a combination of solid and liquid resins.

In some preferred embodiments, one or more of the epoxy resins employed are multifunctional and/or have relatively high functionalities (e.g., epoxy functionalities). When such relatively high functionality resins are employed, it is typically desirable for at least 2%, more typically at least 5% and even possibly at least 10% of the epoxy resin to have a functionality that is greater than about 2 (e.g., about 2.6 or greater), more typically greater than about 3 (e.g., about 3.6 or greater) and still more typically greater than about 4.5 (e.g., about 5.1 or greater). Advantageously, such higher functionality can, in certain instances, provide for improved high temperature performance, improved lap shear strength or a combination thereof. It may preferable for a substantial portion of the epoxy resin to be comprised of one or more solid epoxy resins. Such one or more solid epoxy resins typically comprise at least about 50%, although possibly less, more typically at least 75%, even more typically at least 80% and still more typically at least 93% by weight of the (or any) epoxy resin present in the composition. It is also contemplated that the (or any) epoxy resin of some compositions may be substantially entirely, entirely or consists essentially of solid resin. Examples of suitable epoxy resins, without limitation, are sold under the trade designations DER® 661, 662, 664 or 331 and are commercially from Dow Chemical Company, Midland, Mich. and under the trade designation ARALDITE GT 7071, GT 7072, GT 7074 or 1280 ECN commercially available from Huntsman.

The epoxy resins are present in a sufficient amount such that the compositions containing them are capable of functioning as desired. The epoxy resin is a significant or the primary reactive material in the compositions. The epoxy resins are preferably present in the compositions (epoxy resin compositions) in an amount of about 30 parts by weight or greater based on the weight of the epoxy resin based compositions and more preferably about 33 parts by weight or greater. The epoxy resins are preferably present in an amount of about 50 parts by weight or less based on the weight of the epoxy resin based compositions and more preferably about 40 parts by weight or less.

Epoxy compositions may be used in a variety of applications and in use may contain a number of other functional additives. The additive composition disclosed herein may utilized with any epoxy compositions wherein improved toughness and elongation are desired while maintaining the glass transition temperature of the epoxy composition. The epoxy compositions may be formulated as one-part heat cure compositions with the curative included in a latent form or as two-part compositions with an epoxy resin component and a hardener component including the curative. A two part composition may comprise two parts with the epoxy resins in one part and a room temperature curing catalyst and a curing agent in the other part.

Epoxy resin compositions preferably contain one or more curing agents which react with the epoxy groups on the epoxy resin to form crosslinked thermoset cured products. Any compounds that react with epoxy resins under reasonable conditions may be utilized as curing agents herein. One or more curing agents and/or curing agent accelerators may be added to the epoxy resin compositions. Amounts of curing agents and curing agent accelerators can vary within the epoxy resin compositions depending upon the desired properties of the cured material, the desired cure conditions (e.g., manufacturing conditions) and the like. Preferably, the curing agents assist the epoxy resin based compositions in curing by crosslinking of the epoxy containing materials, other polymers or a combination thereof. Useful classes of curing agents include agents that cross-link the epoxy resin and/or other ingredients by addition reaction or catalyzed reaction. The curing agent materials can be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, diamino diphenyl solfone, anhydrides, mercaptans, imidazoles, ureas, tertiary amines, BF3 complexes or mixtures thereof. Particular preferred curing agents include modified and unmodified polyamines or polyamides such as triethylenetetramine, diethylenetriamine tetraethylenepentamine, cyanoguanidine, dicyandiamides and the like.

It is also contemplated that the epoxy resin based compositions may be, in certain embodiments, substantially or entirely cured without curing agents. The curing agents are present in a sufficient amount such that the epoxy resin based composition cure as desired. The curing agents are preferably present in the compositions (epoxy resin compositions) in an amount of about 2 parts by weight or greater based on the weight of the epoxy resin based compositions and more preferably about 3 parts by weight or greater. The curing agents are preferably present in an amount of about 7 parts by weight or less based on the weight of the epoxy resin based compositions and more preferably about 6 parts by weight or less.

An accelerator for the curing agents (e.g., a modified or unmodified urea such as methylene diphenyl bis urea, an imidazole (2-methyl imidazole) or a combination thereof) may also be included in the compositions. Other suitable catalysts or curing agent accelerators include tertiary amines and metal compounds. Suitable tertiary amine catalysts include triethylamine, tributylamine, N-methylmorpholine, N-ethylmorpholine, N,N,N',N'-tetramethylethylene diamine, pentamethyldiethylene triamine, and higher homologs, 1,4-diazabicyclo[2.2.2]octane, N-methyl-N'-(dimethylaminoethyl)piperazine, bis(dimethylaminoalkyl)piperazines, N,N-dimethylbenzylamine, N,N-dimethylcyclohexylamine, N,N-diethylbenzylamine, bis(N,N-diethylaminoethyl)adipate, N,N,N',N'-tetramethyl-1,3-butanediamine, N,N-dimethyl-.beta.-phenylethylamine, 1-methyl imidazole, 1,2-dimethylimidazole, 2-methylimidazole, monocyclic and bicyclic amidines, bis(dialkylamino) alkyl ethers (U.S. Pat. No. 3,330,782), and tertiary amines containing amide groups (preferably formamide groups). The catalysts used may also be the known Mannich bases of secondary amines (such as dimethylamine) and aldehydes (preferably formaldehyde) or ketones (such as acetone) and phenols. The cure accelerators are present in a sufficient amount such that the epoxy resin based composition cure at a reasonable speed. The cure accelerators are preferably present in the compositions (epoxy resin compositions) in an amount of 0 parts by weight or greater based on the weight of the epoxy resin based compositions and more preferably about 0.1 parts by weight or greater. The cure accelerators are preferably present in an amount of about 1 part by weight or less based on the weight of the epoxy resin based compositions and more preferably about 0.8 parts by weight or less.

Generally, it is contemplated that experimentation by the skilled artisan can produce desirable cure times using various of the curing agents and/or accelerators discussed above or others. It has been found that for a dicyanamide curing agent or other agents used for cure during activation, other curing agents or accelerators such as a modified polyamine (e.g., cycloaliphatic amine) sold under the tradename ANCAMINE 2441 or 2442 or 2014 AS; an imidazole (e.g., 4-Diamino-6[2'-methylimidazoyl-(1')ethyl-s-triazine isocyanuric) sold under the tradename CUREZOL 2MA-OK, both commercially available from Air Products; an amine adduct sold under the tradename PN-23, an adipic hydrazide sold under the tradename ADH both commercially available from Ajinimoto or an adduct of imidazole and isocyanate sold under the tradename LC-65 and commercially available from A & C Catalyst can produce particularly desirable cure times. Desirable cure times can vary depending upon manufacturing processes and other factors. Moreover, such curing times can depend upon whether additional energy (e.g., heat, light, radiation) is applied to the material or whether the material is cured at room temperature. Other cure accelerators that may be utilized in the epoxy resin formulations include.

The epoxy resin compositions may further comprise one or more latent cure accelerators. A latent cure accelerator is a cure accelerator that does not cure unless exposed to certain conditions that release the accelerator. In many instances the latent accelerator releases the accelerator when exposed to elevated temperatures such as 90° C. or greater, preferably 100° C. or greater and more preferably 120° C. or greater. Preferably the latent accelerator releases the accelerator at 150° C. or less. Thermally activatable or latent curing agents which may be used are guanidines, substituted guanidines, substituted ureas, melamine resins, guanamine derivatives, cyclic tertiary amines, aromatic amines and/or mixtures thereof. The hardeners may either participate stoichiometrically in the curing reaction or they may, however, also be catalytically active. Examples of substituted guanidines are methylguanidine, dimethylguanidine, trimethylguanidine, tetramethylguanidine, methylisobiguanidine, dimethylisobiguanidine, tetramethyl-isobiguanidine, hexamethylisobiguanidine, heptamethylisobiguanidine and very particularly cyanoguanidine (dicyandiamide).

Examples of suitable guanamine derivatives which may be mentioned are alkylated benzoguanamine resins, benzoguanamine resins or methoxymethylethoxymethylbenzoguanamine. Other known latent cure accelerators include blocked isocyanates, blocked amines, boron based complexes, phosphonium complexes, and the like. Preferred latent cure accelerators include boron trifluoride monoethylamines, toluene diisocyanate prepolymers blocked with alkylate phenols, 1,6-hexamethylene diisocyante dimers or trimers, isonate prepolymers blocked with oximes, and the like. The latent cure accelerators are present in a sufficient amount such that the epoxy resin based composition cure at a reasonable speed. The latent cure accelerators are preferably present in the compositions (epoxy resin compositions) in an amount of 0 parts by weight or greater based on the weight of the epoxy resin based compositions and more preferably about 0.1 parts by weight or greater. The latent cure accelerators are preferably present in an amount of about 1 part by weight or less based on the weight of the epoxy resin based compositions and more preferably about 0.8 parts by weight or less.

Generally, it is desirable for the epoxy resin based compositions to include at least one impact modifier. As used herein, like with any other ingredients of the present invention, the term "impact modifier" can include one impact modifier or plural impact modifiers. The impact modifier can include thermoplastics, thermosets or thermosettables, elastomers, elastomer containing adducts, phenoxy resins, combinations thereof or the like.

The epoxy compositions may contain one or more elastomers as an impact modifier to improve elongation and impact properties of the cured compositions. The elastomeric materials may be independently admixed into the epoxy compositions or may be added as part of an admixture of materials. Exemplary elastomers include, without limitation, natural rubber, styrene-butadiene rubber, polyisoprene, polyisobutylene, polybutadiene, isoprene-butadiene copolymer, neoprene, butyl rubber, polysulfide elastomer, acrylic elastomer, acrylonitrile elastomers (e.g., butadiene/acrylonitrile rubber), silicone rubber, polysiloxanes, polyester rubber, polyurethane rubber, diisocyanate-linked condensation elastomer, EPDM (ethylene-propylene diene rubbers), chlorosulphonated polyethylene, fluorinated hydrocarbons and the like. According to one preferred embodiment, the elastomer is partially or substantially entirely (e.g., at least 80%, 90%, 95% or more) or entirely composed of a nitrile rubber (e.g., a butadiene/acrylonitrile rubber). If such a nitrile rubber is employed, the rubber preferably includes between about 10% or less and about 50% or more by weight nitrile, more preferably between about 20% and about 40% by weight nitrile and even more preferably between about 25% and about 35% by weight nitrile. Advantageously, the elastomer can provide desired properties to the cured epoxy compositions, such as toughness, flexibility or the like. When used, elastomer is typically at least about 1%, although possibly less, more typically at least about 5% and still more typically at least about 9% and possibly even at least about 12% by weight of the handling film. Moreover, when used, elastomer is also typically less than about 40%, although possibly more, more typically less than about 25% and even more typically less than about 18% by weight of the handling film. Examples of desirable elastomers are sold under the tradenames NIPOL DN 3335, commercially available from Zeon Chemicals.

An elastomer-containing adduct may be employed in the epoxy resin based compositions as an impact modifier, and preferably in a relatively high concentration (e.g., on the order of the epoxy resin). The elastomer-containing adduct may be a combination of two or more particular adducts and the adducts may be solid adducts or liquid adducts at a temperature of 23° C. or may also be combinations thereof. The adduct itself generally includes about 1:5 to 5:1 parts of epoxy to elastomer, and more preferably about 1:3 to 3:1 parts or epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. Exemplary elastomers are disclosed hereinbefore. In one embodiment, recycled tire rubber is employed. Examples of additional or alternative epoxy/elastomer or other adducts suitable for use in the present invention are disclosed in U.S. Patent Publication 2004/0204551, which is incorporated herein by reference for all purposes. The elastomer-containing adduct, when added to the epoxy resin based compositions is added to modify the strength, toughness, stiffness, flexural modulus, or the like of the cured products made therefrom. Additionally, the elastomer-containing adduct may be selected to render the compositions more compatible with coatings such as water-borne paint or primer system or other conventional coatings. According to one preferred embodiment, the compositions include a substantial portion of one or more solid adducts (i.e., solid at a temperature of about 23° C.) for assisting in improving properties such as impact strength, peel strength, combinations thereof or others. Examples of suitable epoxy/elastomer adduct, without limitation, are sold under the trade designation HYPOX RK8-4, commercially available from CVC Chemical or B-Tough A3 available from Croda. The epoxy elastomer adducts may be present in a sufficient amount so as to impact the referenced properties. The epoxy elastomer adducts are preferably present in the compositions (epoxy resin compositions) in an amount of 5 parts by weight or greater based on the weight of the epoxy resin based compositions and more preferably about 7 parts by weight or greater. The epoxy elastomer adducts are preferably present in an amount of about 25 parts by weight or less based on the weight of the epoxy resin based compositions and more preferably about 20 parts by weight or less.

As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The first and second polymeric materials of the core/shell impact modifier can include elastomers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like. Preferred core/shell impact modifiers are formed by emulsion polymerization followed by coagulation or spray drying. It is also preferred for the impact modifier to be formed of, or at least include a core-shell graft copolymer. Examples of useful core-shell graft copolymers are those where hard containing compounds, such as styrene, acrylonitrile or methyl methacrylate, are grafted onto core made from polymers of soft or elastomeric containing compounds such as butadiene or butyl acrylate. U.S. Pat. No. 3,985,703, which is herein incorporated by reference for all purposes, describes useful core-shell polymers, the cores of which are made from butyl acrylate but can be based on ethyl isobutyl, 2-ethylhexyl or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate. The shell portion may be polymerized from methyl methacrylate and optionally other alkyl methacrylates, such as ethyl, butyl, or mixtures thereof methacrylates. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof. One preferred impact modifier is a core/shell polymer includes a shell of polymethyl methacrylate (PMMA) or acrylonitrile polymer or copolymer and a core of butadiene or styrene butadiene material. Examples of useful core shell rubbers include, but are not limited to those sold under the tradename, PARALOID, commercially available from Rohm & Haas Co. Preferred grades of PARALOID are sold under the designations EXL-2691A or EXL-2650A. Another preferred grade is sold under the tradename CLEARSTRENGTH E-950, commercially available from Arkema. Other preferred core/shell impact modifiers include those with a relatively soft acrylate core (e.g., polybutyl acrylated or other low Tg acrtyate) and a hard acrylate shell (e.g., PMMA). Preferred grades of these type of impact modifiers are sold under the tradename DURASTRENGTH D-440 commercially available from Arkema and Paraloid EXL-2300 and 2314 commercially available from Rohm and Haas.

The core/shell impact modifiers may be present in a sufficient amount so as to improve the impact properties of the cured epoxy resin compositions. The core/shell impact modifiers are preferably present in the compositions (epoxy resin compositions) in an amount of 10 parts by weight or greater based on the weight of the epoxy resin based compositions and more preferably about 11 parts by weight or greater. The core/shell impact modifiers are preferably present in an amount of about 15 parts by weight or less based on the weight of the epoxy resin based compositions and more preferably about 13 parts by weight or less.

Alternative impact modifiers may be provided as particulate (e.g., ground or pulverized) elastomer or rubber or adduct thereof (e.g., carboxy terminated butadiene acrylonitrile rubber or adduct thereof). Such modifier will typically have a relatively low Tg as discussed below. Examples of desirable impact modifiers of this type include HYPOX RK 8-4, commercially available from CVC specialty chemicals or Araldite ES 1522, commercially available from Huntsman Chemical.

The epoxy resin compositions may comprise one or more phenoxy resins which can be used to modify the impact properties. Phenoxy resins are usually derived from the same materials as epoxy resins, but phenoxy resins do not have epoxy groups on their molecular chains. Phenoxy resins do have hydroxy groups on their molecular chains; these hydroxy groups enable crosslinking (curing) with isocyanates, anhydrides, triazines, and melamines. Phenoxies are copolymers that are usually derived from bisphenol A and epichlorohydrin and have the repeating structural formula Formula I:

In preferred embodiments of aqueous phenoxy dispersion adhesive, "p" in the above structural formula (Formula I) is from about 35 to about 120 and preferably from about 35 to about 105. The phenoxy accordingly has a molecular weight of from about 10,000 to about 35,000 and preferably from about 10,000 to about 30,000. The phenoxy resins are present in a sufficient amount such that the epoxy resin based composition has the desired impact properties. The phenoxy resins are preferably present in the compositions (epoxy resin compositions) in an amount of 0 parts by weight or greater based on the weight of the epoxy resin based compositions and more preferably about 8 parts by weight or greater. The phenoxy resins are preferably present in an amount of about 15 parts by weight or less based on the weight of the epoxy resin based compositions and more preferably about 13 parts by weight or less.

One or more blowing agents may be added to the epoxy resin based composition for producing inert gasses that form, as desired, an open and/or closed cellular structure within the cured composition. In this manner, it may be possible to lower the density of articles fabricated from the material. In addition, the material expansion helps to improve sealing capability, substrate wetting ability, adhesion to a substrate, acoustic damping, combinations thereof or the like. The blowing agent may include one or more nitrogen containing groups such as amides, amines and the like. Examples of suitable blowing agents include azodicarbonamide, dinitrosopenta-methylenetetramine, 4,4,-oxy-bis-(benzenesulphonylhydrazideXOBSH), trihydrazino triazine and N, N,-dimethyl-N,N,-dinitrosoterephthalamide. Some preferred blowing agents are hydrazides or azodicarbonamides sold under the tradenames CELOGEN® OT and CELOGEN® AZ, commercially available from Crompton, Inc. Preferred physical blowing agent are solvents encapsulated in thermoplastic and sold under the tradename EXPANCEL and commercially available from Akzo Nobel. An accelerator for the blowing agents may also be provided in the epoxy resin based composition. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles, ureas or the like. Amounts of blowing agents and blowing agent accelerators can vary widely within the expandable material depending upon the type of cellular structure desired, the desired amount of expansion of the expandable material, the desired rate of expansion and the like. Exemplary ranges for the amounts of blowing agents and blowing agent accelerators in the expandable material range from about 0.1% by weight to about 5 or 10% by weight and are preferably in the epoxy resin compositions in fractions of weight percentages.

The epoxy resin compositions may also include one or more fillers, including but not limited to particulated materials (e.g., powder), beads, microspheres, fibers, and the like. Preferably the filler includes a relatively low-density material that is generally non-reactive with the other components present in the epoxy resin compositions. Examples of fillers include silica, diatomaceous earth, glass, clay, talc, pigments, colorants, glass beads or bubbles, glass, carbon ceramic fibers, and the like. Examples of suitable fillers include, without limitation, talc, vermiculite, pyrophyllite, sauconite, saponite, nontronite, montmorillonite or mixtures thereof. The clays that may be used as fillers may include clays from the kaolinite, illite, chloritem, smecitite or sepiolite groups, which may be calcined. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed. In some embodiments, one or more mineral or stone type fillers such as calcium carbonate, sodium carbonate or the like may be used as fillers. In some embodiments, silicate minerals such as mica may be used as fillers. It has been found that, in addition to performing the normal functions of a filler, silicate minerals and mica in particular improved the impact resistance of the cured expandable material. The fillers are preferably present in the epoxy resin compositions in an amount of 0 parts by weight or greater based on the weight of the epoxy resin based compositions and more preferably about 3 parts by weight or greater. The fillers are preferably present in an amount of about 40 parts by weight or less based on the weight of the epoxy resin based compositions and more preferably about 35 parts by weight or less.

It is contemplated that one of the fillers or other components of the material may be thixotropic for assisting in controlling flow of the material as well as properties such as tensile, compressive or shear strength. Certain fillers, which may or may not be thixotropic, can assist in providing self-supporting characteristics to some of the epoxy resin based compositions, for example where they are utilized as expandable materials. Preferred examples of such fillers include, without limitation, glass, carbon fibers, graphite, natural fibers, chopped or continuous glass, ceramic, aramid, or carbon fiber or the like. Other preferred fillers that can provide self-support include wollastonite (e.g., a calcium silicate having a needle-like structure with an aspect ratio of 3:1 to 20:1), aramid pulp or the like. A clay or mineral filler that can provide desirable rheological characteristic and includes a blend of organically modified minerals is sold under the tradename GARAMITE commercially available from Southern Clay Products.

The epoxy resin based compositions may further comprise one or more adhesion promoters for the purpose of improving the adhesion of the epoxy resin compositions or cured products thereof to other substrates. Any compounds that improve the adhesion of the epoxy resin based formulations or their cured products to a substrate may be used as an adhesion promoter. Although, many adhesion promoters may be used, amine or epoxy functional molecules such as amine or epoxy functional silanes and polyether type thermoplastic polyurethanes have been found to be particularly desirable. One exemplary adhesion promoter is a glycidyl propyl trimethoxy silane sold under the tradename Z-6040, commercially available from Dow Corning, glycidoxypropyl trimethoxysilane available under the Tradename GLYMO available from Evonik Industries. One preferred class of adhesion promoters are polyether type thermoplastic polyurethanes. The adhesion promoters are present in a sufficient amount to improve adhesion of the epoxy resin compositions to substrates or surfaces. The adhesion promoters are preferably present in the compositions (epoxy resin compositions) in an amount of 2 parts by weight or greater based on the weight of the epoxy resin based compositions and more preferably about 6 parts by weight or greater. The adhesion promoters are preferably present in an amount of about 10 parts by weight or less based on the weight of the epoxy resin based compositions and more preferably about 9 parts by weight or less.

Other additives, agents or performance modifiers may also be included in the epoxy resin compositions as desired, including but not limited to a UV resistant agent, a flame retardant, an impact modifier, a heat stabilizer, a UV photoinitiator, a colorant, a processing aid, a lubricant, a reinforcement. As one example, the material can include moisture scavenger such as a metal oxide (e.g., calcium oxide).

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw materials, incomplete conversion of the reactants and formation of by-products.

The composition may be formulated by blending the components together using means well known in the art. Generally, the components are blended in a suitable mixer or an extruder. Formation of the epoxy resin based composition can be accomplished according to a variety of new or known techniques. Preferably, the epoxy resin based composition is formed as a material of substantially mixed and or homogeneous composition prior to activation thereof. However, it is contemplated that various combining techniques may be used to increase or decrease the concentration of certain components in certain locations of the epoxy resin based composition. According to one embodiment, the epoxy resin based composition formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a substantially mixed or homogenous composition. According to another embodiment, the epoxy resin based composition may be formed by heating one or more of the components that are generally easier to soften or liquidize such as the polymer based materials to induce those components into a mixable state. Thereafter, the remaining components may then be intermixed with the softened components. It is also contemplated for any of these embodiments that the material can be provided individually, as admixtures or combinations thereof to an extruder. The extruder then mixes the materials to form the epoxy resin based compositions. Even further, it is contemplated that the epoxy resin based composition may be fully mixed and formed and then fed to an extruder for dispensing as discussed further below. Depending upon the components used, it may be important to assure that the temperature of the components remains below certain activation temperatures that might cause the epoxy resin based composition to activate (e.g., form gasses, flow, cure or otherwise activate). Notably, when the epoxy resin based composition contains a blowing agent or a latent heat activated accelerator or curing agent, it is typically desirable to maintain the temperature of the epoxy resin based composition below a temperature that will activate the blowing agent, curing agent or both during formation of the epoxy resin based composition or before the application thereof to a surface. In situations where it is desirable to maintain the epoxy resin based composition at lower temperatures it may be desirable to maintain the components in a semi-solid or viscoelastic state using pressure or a combination of pressure and heat to intermix the components of the epoxy resin based composition. Various machines such as extruders, or otherwise have been designed to applying heat, pressure or both to materials. In essence the ingredients may be all fed to a mixing apparatus separately. Alternatively some of the ingredients may be premixed in the form of a master batch or a preblend and then contacted with the other ingredients in a mixer or just prior to being fed to a mixer. The ingredients are mixed to form a generally homogeneous mixture. The Mixing can be performed in an extruder and the resulting homogeneous mixture extruded into a desired shape, for instance a sheet, film, fiber, bar or the like.

In embodiments wherein the epoxy resin based compositions are useful as an adhesive material, after formation of the epoxy resin based composition, the material is typically applied to a surface or substrate and activated. Activation of the material may include at least some degree of foaming or bubbling in situations where the activatable material includes a blowing agent. Such foaming or bubbling can assist the activatable material in wetting a substrate and forming an intimate bond with the substrate. Alternatively, however, it shall be recognized that the activatable material may be activated to soften and/or flow without foaming or bubbling and may still substantially wet the substrate to form an intimate bond. Formation of the intimate bond will typically but not necessarily occur upon curing of the adhesive material.

It shall be understood that, depending upon the intended application, the epoxy resin based composition may be applied and activated in different ways and at different times. Thus, exemplary uses of the epoxy resin based composition are discussed below to illustrate preferred methodologies of application and activation thereof. In particular, where the epoxy resin based composition is used as an adhesive material, it may used for, amongst others, reinforcement, sealing and adhering, acoustic baffling, sealing and protecting the surface of a substrate, sealing and an additional function, such as coating or adhering a second substrate to the surface, or the like. Example of potential uses for the adhesive material are disclosed in U.S. Pat. Nos. 7,125,461 and 7,892,396, both of which are incorporated. The epoxy resin based composition has been found particularly useful as a structural adhesive material.

Some epoxy resin based compositions may be used as structural adhesives. In such uses the compositions are typically put in contact with at least an attachment surface of a first substrate and also, typically an attachment surface of a second substrate. Such contacting may occur prior to activation of the epoxy resin based composition, during activation of the epoxy resin based composition or a combination thereof. For example, the epoxy resin based composition may be contacted with one of the surfaces and then activated to flow, expand or both to contact the other surface. As another example, the epoxy resin based composition may be contacted and pressed between the surfaces and subsequently activated. It should also be recognized that the surfaces, substrates or both may be part of single component or member or two or more components or members that are attached to each other by the epoxy resin based composition and optional additional attachments.

In one embodiment, the surfaces and substrates are part of components of an automotive vehicle. In such an embodiment, the adhesive material is typically activated at an elevated temperature in an automotive coating drying operation (e.g., at temperatures common to e-coat or automotive painting operations (temperatures typically above 120 or 150 OC)) to adhere to the surfaces. Contact with attachment surface of the first member and the second member may occur prior to or during activation and curing of the material. Examples of structural adhesive applications are disclosed in U.S. Pat. Nos. 6,887,914; and 6,846,559; which are incorporated herein by reference for all purposes.

The epoxy resin based composition, when used as an adhesive material, may be applied to a surface manually or automatically (e.g., through direct extrusion onto a surface). In a preferred embodiment, the epoxy resin based composition is applied as a preformed part. In such an embodiment, the epoxy resin based composition is shaped to form an adhesive material part of substantially predetermined dimension, for example by molding or by extrusion and/or cutting. Thereafter, the adhesive material part is then manually applied, automatically applied or a combination thereof to a surface or surfaces. In a preferred embodiment, adhesive material parts are disposed upon (e.g., extruded onto) a release material (e.g., release paper) such that they can later be removed and manually applied, automatically applied or a combination thereof to one or more surfaces as already described herein. To aid in application, particularly manual application, of the adhesive material, a handling layer may be applied to the adhesive material since the adhesive material, as a part or otherwise, may be substantially tacky prior to application. The handling layer may be a film, a coating, a powder, a fibrous material, a web, combinations thereof or the like. Examples of suitable handling layers are disclosed in U.S. Pat. No. 6,811,864 and U.S. Patent Application Publication 2004/0076831, both of which are incorporated herein by reference for all purposes. Thus, it is possible that an adhesive material part may be provided with a layer (from less than about 10 microns to about 2 cm (e.g., on the order of less than about 1 mm)) that is generally free of tack for facilitating handling. It is also contemplated that the structural adhesive material, the layer or both may be formed of the adhesive material of the present invention.

The epoxy resin based compositions may used in any applications wherein toughened epoxies are utilized, for example as structural adhesives, expandable adhesives, adhesive films, coatings, epoxy based foams, and the like. Particular applications include bonding structural parts of vehicles together, bonding trim parts to vehicles, in structural reinforcement parts, and the like Illustrative Embodiments of the Invention The following examples are provided to illustrate the invention, but are not intended to limit the scope thereof. All parts and percentages are by weight unless otherwise indicated.

The following ingredients are combined as described hereinafter. Example 1 is a composition useful as a 100% Expand able adhesive. Example 2 is a composition useful as an adhesive film. Example 3 is structural foam. Example 4 is a non-expandable structural film adhesive.

TABLE 1

| Component 1. Parts by Weight | Ex 1 Wt[1] | Ex 2 Wt[1] | Ex 3 Wt[1] | Ex 4 Wt[1] | Comp Ex 1 Wt[1] | Comp Ex 2 Wt[1] |
|---|---|---|---|---|---|---|
| 70% Phenoxy Resin blended 30 percent epoxy resin | 0 | 13.50 | 22.52 | 13.50 | 14.50 | 15.65 |
| Solid epoxy bisphenol A based resin with a high epoxy equivalent weight | 24.44 | 15.92 | | 14.92 | 16.72 | 17.92 |
| Aramide fibers dispersed in solid epoxy resin | 4.51 | 0 | 4.37 | 4.37 | | |
| Polyvinyl butyral resin | 4.52 | 0 | 4.38 | | | |
| Solid epoxy bisphenol A based resin with a low epoxy equivalent weight | 5.56 | 6.39 | 5.39 | 5.39 | 6.39 | 7.39 |
| Liquid epoxy bisphenol F based resin with a low epoxy equivalent weight | 5.00 | 8.42 | 10.51 | 5.51 | 8.41 | 9.41 |
| Copolyamide (based on Nylon 11) | 10.47 | 11.12 | 11.12 | 11.12 | 11.80 | |
| Block co-polymer of a polyamide and a polyether | 8.11 | 4.38 | 4.34 | 4.38 | | 5.38 |
| Epoxy functional toughening agent | 10.08 | 17.65 | 13.31 | 17.65 | 18.65 | 19.65 |
| acrylate based Core shell rubber | 12.44 | 12.06 | 12.06 | 12.06 | 12.76 | 12.76 |
| Polyether type thermoplastic polyurethane (adhesion promoter) | 2.68 | 2.60 | 2.60 | 2.60 | 2.60 | 3.00 |
| Calcium oxide | 3.53 | 3.43 | 3.43 | 3.43 | 3.43 | 4.00 |
| Zinc oxide | 0.20 | 0 | 0.20 | | | |
| Quarternay Ammonium nano particle size clay | 0.55 | 0 | 0.53 | 0.53 | | |
| Azodicarbonamide | 0.72 | 0 | 0.70 | | | |
| Urea | 0.35 | 0.34 | 0.34 | 0.34 | 0.34 | 0.34 |
| Dicydiamide | 4.33 | 4.20 | 4.20 | 4.20 | 4.20 | 4.20 |

The above described ingredients are combined by mixing by a sigma blade mixer. The combined compositions are then formed into test samples by pressing. Lap shear samples are prepared by pressing and tested according to test method EN 1645. Cohesive failure in the lap shear test means that the adhesive broke before the adhesive joint gave way. H7 ageing means humid cataplasm testing (7 days @ 70° C., 98% RH). Films are prepared from some of the compositions by calendaring or pressing at 70° C. The formed samples are tested for a number of properties according to the test methods as listed in Table 2.

| Property | Test Method | Ex 1 60 | Ex 2 73 | Ex 3 46 | Ex 4 62 | Com 1 74 | Com 2 75 |
|---|---|---|---|---|---|---|---|
| Stress at Fmax (MPa) | ISO 527-1 | 9.6 | 32 | 8.2 | 32 | | |
| Elongation (%) | ISO 527-1 | 21.8 | 20.6 | 14 | >>23 | | |
| Tg (DMA pic tan Delta) ° C. | | 100 | 95 | 100 | | | |
| Lap Shear (MPa) (Failure mode, % Cohesive Failure) | EN 1465 | 7.2 (100%) | 35.5 (95%) | 6.5 (90%) | 36 (90%) | | |
| Tensile Modulus (MPa) | ISO 527-1 | 348 | 1700 | >382 | 1900 | | |
| Expansion rate 40 Min at 160° C. % | | | 94 | | 97 | | |
| T-Peel (N/mm) % CF Galva G10-10 | NF EN ISO 11339 | | 7.75 (0%) | | 11.3 (0%) | | |
| T-Peel (N/mm) % CF Galva G10-10 + oil Ferrocoat N6130 | NF EN ISO 11339 | | 6.3 | | | | |
| Wedge Impact (N/mm) Galva G10-10 material thickness 0.3 mm | ISO 11343 | | | | 33.5 | | |

1 Film data.

Figure 2:
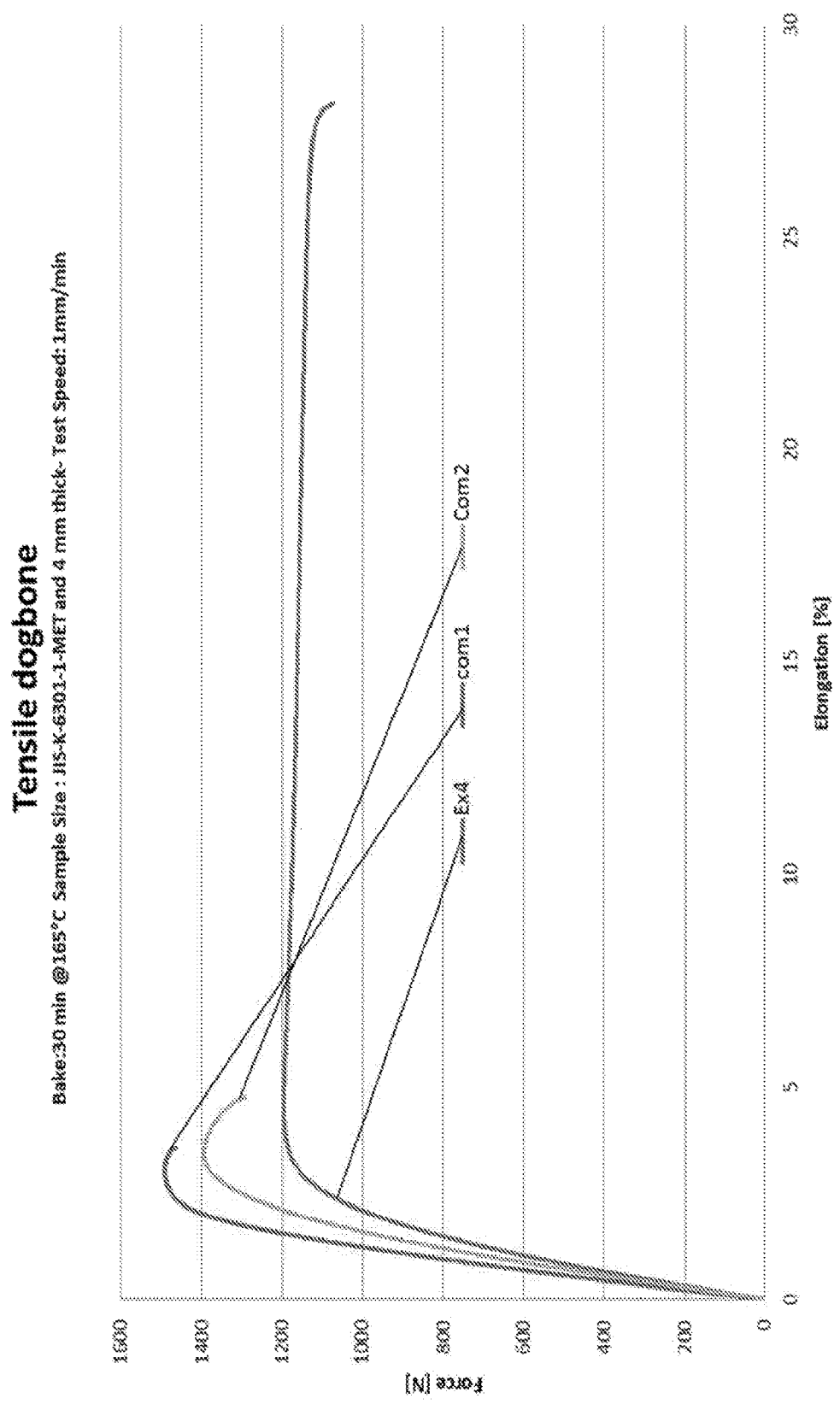
FIG. 2 is a graph of elongation data.

Example 4 and comparative Examples 1 and 2 are elongated, and the elongation numbers are displayed in a histogram shown in FIG. 1. The samples are formed into a tensile dogbone JIS-K-6302-1 MET and 4 mm thick and baked for 30 minutes at 165° C. The test speed is 1 mm/min. Dogbones of the materials of Example 4 and Comparative Examples 1 and 2 are formed as disclosed above and are tested by lap shear testing according to EN1465, the results are graphed in FIG. 2.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composition comprising:
    a) from about 30 to about 50 parts by weight of one or more epoxy resins having on average more than one epoxy functional group per molecule;
    b) from about 2 to about 7 parts by weight of one or more curing agents for epoxy resins; and
    c) i) a mixture of from about 3 to about 12 parts by weight of one or more block co-polymers having one or more polyamide blocks and one or more polyether blocks, and from about 5 to about 15 parts by weight of one or more co-polyamides; and
    d) from about 5 to about 20 parts by weight of one or more elastomers.

2. A composition according to claim 1, wherein the molar ratio of c) i) the one or more block co-polymers having one or more polyamide blocks and one or more polyether blocks to the one or more co-polyamides or the one or more copolyamide sections and one or more polyether blocks in the copolymer is from about 2:1 to 1:6.

3. A composition according to claim 1, which includes one or more nucleators and/or blowing agents.

4. A composition according to claim 1, wherein the melting point of the one or more co-polyamides is about 140° C. or less.

5. A composition according to claim 1, wherein the one or more block co-polymers having one or more polyamide blocks and one or more polyether blocks comprise polyether blocks of polyalkylene oxides.

6. A composition according to claim 1 wherein the one or more co-polyamides comprise random copolymers containing at least two different amide units.

7. A composition according to claim 1, including one or more core shell rubbers.

8. A composition according to claim 1, including one or more adhesion promoters.

9. A composition according to claim 2, including one or more thixotropes.

10. A composition according to claim 1, wherein the one or more curing agents is a latent curing agent which is heat activatable.

11. An article comprising a film or foamable structure containing the composition according to claim 1.

12. An article comprising a substrate wherein a portion of at least one surface of the substrate has an uncured composition according to claim 1, disposed thereon.

13. A method comprising applying a composition according to claim 1, to a first substrate, contacting a second substrate with the first substrate with the applied composition disposed between the substrates, and exposing the contacted substrates to temperatures at which the applied composition cures and the substrates are bonded together.

14. The method of claim 13, wherein the contacted substrates are exposed to temperatures of at least about 100° C. to cause curing of the composition.

15. The method of claim 14, wherein the composition is applied to the substrate by an extrusion process.

16. The method of claim 14, wherein the composition is applied in a thickness of less than 1 mm.

* * * * *